(12) United States Patent
Skyum et al.

(10) Patent No.: US 8,869,990 B2
(45) Date of Patent: Oct. 28, 2014

(54) METHOD AND SYSTEM FOR PROCESSING OF FOOD ITEMS

(75) Inventors: Henrik F. Skyum, Skanderborg (DK); Svend Bækhøj Jensen, Egå (DK); René Knudsen, Langå (DK)

(73) Assignee: Scanvaegt International A/S, Aarhus (DK)

( * ) Notice: Subject to any disclaimer, the term of this patent is extended or adjusted under 35 U.S.C. 154(b) by 934 days.

(21) Appl. No.: 12/525,409

(22) PCT Filed: Feb. 7, 2008

(86) PCT No.: PCT/DK2008/000064
§ 371 (c)(1),
(2), (4) Date: Oct. 9, 2009

(87) PCT Pub. No.: WO2008/095500
PCT Pub. Date: Aug. 14, 2008

(65) Prior Publication Data
US 2010/0051513 A1    Mar. 4, 2010

(30) Foreign Application Priority Data

Feb. 7, 2007   (DK) .................................. 2007 00210
Jun. 12, 2007  (DK) .................................. 2007 00851

(51) Int. Cl.
| | | |
|---|---|---|
| *B07C 5/16* | (2006.01) | |
| *B07C 5/38* | (2006.01) | |
| *G01G 19/30* | (2006.01) | |
| *A22C 17/00* | (2006.01) | |
| *B07C 5/34* | (2006.01) | |

(52) U.S. Cl.
CPC ... *B07C 5/16* (2013.01); *B07C 5/38* (2013.01); *G01G 19/30* (2013.01); *A22C 17/0093* (2013.01); *A22C 17/008* (2013.01); *B07C 5/34* (2013.01)

USPC .......................... 209/645; 209/592; 177/245

(58) Field of Classification Search
USPC ............ 209/3.1, 10, 552, 589, 698, 932, 512, 209/592, 645, 646; 177/145, 245
See application file for complete search history.

(56) References Cited

U.S. PATENT DOCUMENTS

| 5,193,685 A * | 3/1993 | Trevithick .................... 209/3.1 |
|---|---|---|
| 6,508,009 B1 * | 1/2003 | Tubis et al. .................... 33/549 |

(Continued)

FOREIGN PATENT DOCUMENTS

| DE | 19752908 A1 | 6/1999 |
|---|---|---|
| DE | 102004056031 A1 | 5/2006 |

(Continued)

OTHER PUBLICATIONS

International Search Report for International Appl. Serial No. PCT/DK2008/000064 dated May 28, 2008.

*Primary Examiner* — Joseph C Rodriguez
*Assistant Examiner* — Kalyanavenkateshware Kumar
(74) *Attorney, Agent, or Firm* — Pearne & Gordon LLP

(57) ABSTRACT

A method and system for the processing of items that are supplied to a batching apparatus, where the batching apparatus comprises at least one handling means of the robotic type. By means of the batching apparatus a first process is performed, according to which items are selectively batched in consideration of measured, detected and/or estimated data for the individual items and in consideration of at least one predefined criterion. Particular items are identified and led to another process, the particular items being items that are deviant in relation to one or more predefined parameter(s) relating to the batching and/or items that have not been selected to be batched during the first process.

27 Claims, 4 Drawing Sheets

(56) References Cited

U.S. PATENT DOCUMENTS

Figure 1:
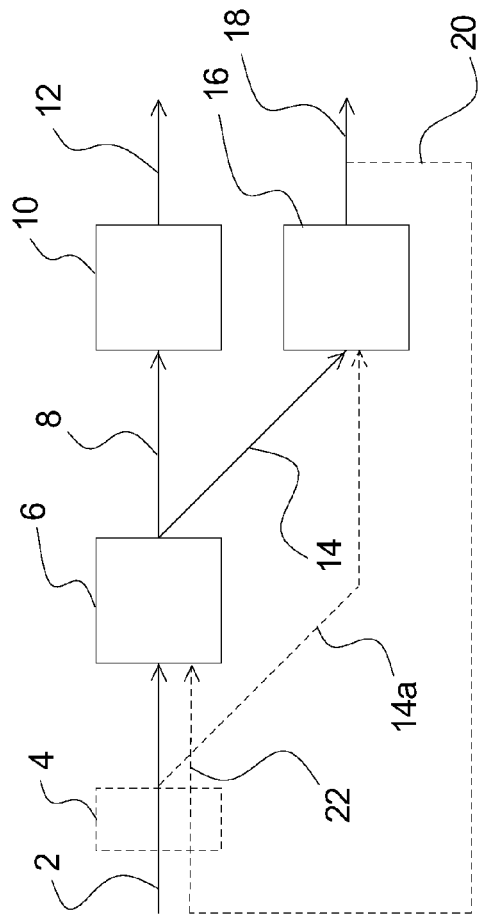

| | | | |
|---|---|---|---|
| 7,258,237 B2 * | 8/2007 | Nielsen | 209/645 |
| 7,967,149 B2 * | 6/2011 | Helgi | 209/592 |
| 2002/0054940 A1 | 5/2002 | Grose et al. | |
| 2004/0176874 A1 | 9/2004 | Kvisgaard et al. | |
| 2006/0060511 A1 | 3/2006 | Tomas et al. | |
| 2007/0005486 A1 * | 1/2007 | Haynes | 705/37 |
| 2007/0178819 A1 * | 8/2007 | McKenna et al. | 452/157 |

FOREIGN PATENT DOCUMENTS

| | | | |
|---|---|---|---|
| EP | 0354009 | A2 | 2/1989 |
| EP | 0781172 | B1 | 7/2002 |
| FR | 2716605 | A | 9/1995 |
| GB | 2116732 | A | 9/1983 |
| JP | 1113621 | A | 5/1989 |
| JP | 095262 | | 11/1991 |
| JP | 8001098 | A | 1/1996 |
| JP | 9029693 | A | 2/1997 |
| JP | 2001139001 | A | 5/2001 |
| JP | 2002114366 | A | 4/2002 |
| JP | 2002143779 | A | 5/2002 |
| JP | 2002166232 | A | 6/2002 |
| JP | 2004230376 | A | 8/2004 |
| JP | 2005193121 | A | 7/2007 |
| WO | 9525431 | A1 | 9/1995 |
| WO | 0023771 | A1 | 4/2000 |
| WO | 0122043 | A2 | 3/2001 |
| WO | WO2005095904 | A1 | 3/2005 |
| WO | 2006061024 | A1 | 6/2006 |
| WO | 2006086450 | A1 | 8/2006 |
| WO | 2007134603 | A1 | 11/2007 |

\* cited by examiner

METHOD AND SYSTEM FOR PROCESSING OF FOOD ITEMS

CROSS-REFERENCES TO RELATED APPLICATIONS

This application is a national stage application of PCT application number PCT/DK2008/000064, filed on Feb. 7, 2008, and incorporated herein by reference in its entirety.

FIELD OF THE INVENTION

The invention relates to a method and a system for processing of items, said items comprising foodstuff items such as meat items, vegetables, fruit etc., where the meat items for example may be parts of pigs, calves, sheep, lamb, fish, poultry such as chicken, etc., just as complete (e.g. essentially undivided) items of e.g. fish, poultry etc. may be processed in accordance with the invention. These items are supplied to a batching apparatus, where by means of one or more handling means of the robot type and in consideration of measured, detected and/or estimated data for the individual items a selective batching of the items is performed in consideration of one or more predefined criterion/criteria.

BACKGROUND OF THE INVENTION

In connection with such batching of items, items are used, which as regards various parameters essentially are within certain ranges, limits or tolerances, so that the supplied items all may be used for forming the desired batches. Thus, an initial sorting of the available items in consideration of one or more parameters may be necessary, which however necessitates undesirable costs and use of resources. Furthermore, it is apparent that as regards certain other parameters relatively large variation may be allowable. However, such an initial sorting of the available items may also have the purpose of identifying and removing items that are for example of a particular high quality and thus have a higher value, which items therefore are processed, e.g. handled, packaged etc, in another manner than the items, which are batched.

An initial sorting of meat products in consideration of desired characteristics is disclosed in e.g. WO 2006/086450 A1, incorporated herein by reference, which relates to a system and a method for sorting cuts of meat, where the meat products initially are sorted in two groups in accordance with threshold or range values for an attribute for the individual meat products. Subsequently, the meat products in each of the two groups are processed as groups.

Moreover, in connection with batching that is performed using one or more handling means of the robot type it may happen that a robot is not able to place a specific item in a desired manner on for example a packaging material, tray or the like, for example if the item is an e.g. oblong item, which is supplied with such an orientation, which requires that the robot has to turn the item a (relatively) large angle in order to be able to place the item in a desired manner, for example without protruding or overhanging the edge of the packaging material or without lying across the already placed items in the batch. Such a turning of the item may not be possible, depending on the robot equipment, or the actual turning of the item may possibly be too time-consuming, when it is desired or required to maintain an optimal work rate or working speed. Further, an item may be too large in general to be placed on or in the actual packaging material. Furthermore, when the batching must be performed with an optimal efficiency and work rate, an item, which otherwise fulfils the requirements and which can be used for the building-up of a specific batch, may pass the effective operating area for the robot(s), before the robot or the robots can manage to grip or pick the item, which item thus is out of reach. In order to avoid such incidents happening, the supply rate and/or the supply speed could be reduced, thereby reducing the total work rate or working speed and thus also the output rate, a solution which evidently is undesirable.

Thus, it is an object of the invention to provide an improved method and an improved system for performing such processing of items, where a batching is involved.

It is a further object of the invention to provide such a method and such a system, by means of which the processing of the items can be performed with consideration to the variation between the supplied items, which furthermore can be done without reducing the efficiency, and whereby the individual items can be utilized optimally.

Even further, it is an object of the invention to provide such a method and such a system, by means of which an initial sorting of the supplied items may be reduced or even dispensed with.

Furthermore, it is an object to achieve a higher degree of flexibility and automation in connection with such processes for batching of items.

These and other objectives are achieved by the invention as it will be explained in further detail in the following.

SUMMARY OF THE INVENTION

The invention relates to a method of processing of items that are supplied to a batching apparatus, said batching apparatus comprising at least one handling means of the robot type,
  where by means of said batching apparatus a first process is performed, according to which items are selectively batched in consideration of measured, detected and/or estimated data for the individual items and in consideration of at least one predefined criterion, and
  where particular items are identified and led to another process, said particular items being
  items that are deviant in relation to one or more predefined parameter(s) relating to the batching and/or
  items that have not been selected to be batched during said first process.

For the purpose of this application, the term "processing" should be understood as comprising any operation, handling, transporting, cutting, trimming, packaging, action, etc., manual as well as automated that is performed on an item. Thus, a cutting, trimming, removal of matter, dividing or the like need not be involved, when a processing takes place.

Furthermore, for the purpose of this application, the batching that is performed in accordance with the first process, relates to a selective forming of a group of items that fulfil the at least one predefined criterion, which group primarily is placed on a carrier, tray or the like, which is a packaging medium or material. Thus, the packaging medium or material may for example be a tray made of a suitable packaging material, which tray after completion of the batch may be subjected to a further packaging operation, for example wrapping with a suitable, e.g. transparent wrapping material.

Even further, it is emphasized that in connection with the present invention a robot is primarily understood as being an automatically controlled manipulator having at least three degrees of freedom. Further, such a robot may be operating in a effective operation area (i.e. in the X-Y-plane) and the robot is designed for gripping or picking-up an item and placing it within the effective operation area (i.e. also operating in the Z-direction). Thus, it will be apparent that the robots involved are of the type having a gripping or picking-up element for the lifting of an item and a controllable movement system for the transfer of a gripped or picked item selectively to a selected depositing position, e.g. on a tray and in particular on a selected position on the tray and possibly with a particular orientation.

The batching apparatus comprising at least one handling means of the robot type may for example be of the type described in WO 2006/061024 A1 and in PCT/DK2007/000237 (WO 2007/134603 A1 published 29 Nov. 2007), incorporated herein by reference.

By the method of processing of items according to the invention, an enhanced efficiency is achieved, in particular the efficiency of the batching apparatus, e.g. the work rate, working speed etc., is enhanced and furthermore the supplied items can be used optimally, for example in dependence on the individual character and properties of the items.

Furthermore, it is made possible to use items as input material for such a processing or such a system, for which items it is not necessary in advance to make certain that the items, as regards specified parameters, e.g. weight, length, volume, shape, fat content, etc., are within certain predefined ranges or limits. Thus, a hitherto unforeseen flexible use of the items is achieved, when compared with prior art systems and processes, and furthermore, a hitherto unforeseen efficiency is achieved, since handling and processing of the possibly deviant items or items, which are not used for the batching while passing the operative batching area, takes place concurrent with the primary process, i.e. the robot based batching of items.

As mentioned above, items, which are led or diverted to the another, second or secondary process, may for example be items, which can not be used or which only with difficulty can be used for the building-up of a specific batch, for example because the items are too large or too small, e.g. as regards weight or volume. Moreover, it can be items that are more suitable for other purposes or applications, for example for cutting up, e.g. in strips or the like. As also mentioned above, it can be items, which are not positioned properly or in a required manner on the conveyor.

Items may also be led or diverted to the another, second or secondary process for reasons related to the quality of the items. For example, it may be items, which has an undesirable shape and/or which for example are not suitable for packaging together with other items and/or which may give an undesirable impression to the e.g. customer. Furthermore, items may be concerned, which have blood stains or for other reasons are deviant as regards the visual impression, e.g. due to discolouring, marbling, etc. Furthermore, it may be items that contain bones, bone splinters, gristle or similar/corresponding matter, which may make the items unsuitable for the batching process and more suitable for the another, second or secondary process. Even further, the meat quality in itself may also be of importance here, for example if the meat has to high a fat content, if the meat is too lean or if the colour of the meat, as also mentioned above, is not in correspondence with desired values, e.g. too light, too dark, undesirable marbling etc.

Further, certain items may be led to said another, second or secondary process, if the items for example should be handled with care, for example via a manual handling. Thus, it may be items that are of a predefined high standard of quality and which therefore should be placed and positioned manually on a packaging medium in consideration of the high quality and in a manner, whereby the item, e.g. the piece of meat in the packaged form presents itself in such a manner that the high quality will be evident to the customer.

It is noted in this context that the terms "first process" and "another, second or secondary process" as used in connection with the present invention do not imply any particular relationship between these processes, neither as regards the time sequence nor the transport sequence. Thus, nothing prohibits that the another, second or secondary process may take place prior to the first process in an item transport route and vice versa. Further, the use of the terms "first process" and "another, second or secondary process" can not be construed as implying anything relating to the value or quality of the items processed or the outputted items stemming from the two kinds of processes. For example, an item which is processed according to the another, second or secondary process may even be of a higher quality than the items batched in accordance with the first process, which will be explained later on.

Advantageously, as specified in claim 2, said another process may comprise an allocation of a particular item, e.g. a deviant and/or an item that has not for other reasons been used for the batching, to a purpose, which is different from the purpose related to said first process.

Hereby, an enhanced flexibility is achieved as regards the use of the supplied items and furthermore an optimal yield and use of the supplied items is achieved, e.g. since the supplied items may be allocated to the specific purposes or applications to which the individual items are better suited.

Thus, it will be understood that the invention as characterized in claim 1 may comprise that the particular items may be used for the same purpose as the first process, i.e. a batching, but in many circumstances it may be preferable to use the particular items for another purpose, which is different from the first purpose, as specified in claim 2.

According to a preferable embodiment, as specified in claim 3, said another process may comprise a cutting and/or trimming of the particular item.

Hereby, the items which may not be suitable for the batching according to the first process, may be processed in order to fulfil certain desired requirements.

According to a further preferable embodiment, as specified in claim 4, said another process may comprise a processing of the particular item, comprising e.g. a cutting and/or trimming of the particular item, whereby one or more processed items is/are provided, said one or more processed items being suitable for said first process, and whereby said one or more processed items is/are recirculated via a return transport route to said batching apparatus of the first process.

Hereby, the further advantage may be achieved that the yield of the batching according to the first process can be enhanced, if desired, thereby e.g. optimizing the work rate of the batching apparatus.

According to a still further preferable embodiment, as specified in claim 5, said another process may comprise a manual processing of the particular item or items.

Hereby, the individual items may be handled in a manner, whereby special consideration may be taken to the items, for example if the diverted item is an item of a particular high quality, which may prosper from for example a packaging which serves to present the high quality item in a manner, whereby the customer will immediately realize the high quality of the item, thereby enhancing the yield of the processing and the flexible use of the supplied items.

Preferably, as specified in claim 6, said batching according to said first process may be performed using at least two handling means of the robot type.

Hereby, a number of advantages is achieved, among these being that the number of otherwise suitable items, which are diverted because the robots can not manage to pick or grip the items while they are passing the operative work area for the robots, is reduced, thus adding to the efficiency of the method, e.g. because these items need not be recirculated, and adding to the optimal use of the items.

According to an advantageous embodiment, as specified in claim 7, handling of particular item, e.g. an identified and in relation to said first process deviant item and/or an item that has not been used for the batching, in connection with said another process, e.g. for guiding or transferring said item, may comprise use of one or more diverter means, diverter wings or diverter arms, one or more robots or one or more corresponding handling means.

Hereby, the particular items which are identified or in general detected as being items which must be led to the another, second or secondary process, can be diverted in an efficient manner using diverting means, which are well-known, or using new embodiments of such diverter means as exemplified in the detailed description, e.g. by using overhead diverter means with diverter flaps moving essentially across the conveyor means, by using diverter arms, which are movable also in the e.g. vertical direction, etc., whereby an enhanced operating efficiency is achieved, e.g. meaning that the items may diverted quickly and that the items may be conveyed with relatively little mutual space while still allowing the items to be selectively diverted.

Preferably, as specified in claim 8, said measured, detected and/or estimated data for the individual items may be provided by means of a measuring or detecting device.

Hereby, the relevant data for the supplied items may be provided in an expedient manner, for example prior to the supplied items reaching the batching apparatus. It is apparent that such a measuring or detecting device may provide information regarding one or more than one parameter, e.g. weight, estimated weight, volume, length, width, thickness, colour, orientation, fat content, marbling, bone content etc., and that these data may be provided using measuring, detecting, calculating etc., means already used in this technical field. Such means may comprise e.g. a static or a dynamic weigher, optical measuring means, magnetic or electromagnetic measuring means, x-ray measuring means, etc.

According to a further advantageous embodiment, as specified in claim 9, said measured, detected and/or estimated data for the individual items may be provided by means of x-ray equipment, vision equipment and/or scanning equipment.

Hereby, further advantages may be achieved, for example by using x-ray equipment, vision and/or scanning equipment for determining e.g. volume of the individual items, where after for example the weight of the items may be determined instead of weighing the items using an e.g. dynamic weighing machine.

Furthermore, when using e.g. vision equipment, camera means, etc. the position of the items, e.g. the items supplied on a conveyor may be determined or detected in an advantageous manner, whereby also the position of items being positioned close to each other, in positions next to each other in the transverse direction of the conveyor, etc. and even overlapping each other may be determined with a desired accuracy, whereby also this information may be provided to the other elements of the system, e.g. the robots, the diverter means, etc., allowing these to handle the items with e.g. required accuracy, even at fast work rates and high delivery rates. Further, certain quality parameters may also be detected and/or evaluated using vision equipment, such as for example colour characteristics, marbling, muscle structures, fat content, etc. Evidently, the dimensional parameter(s) such as length, width, etc. of the items may also be determined using vision equipment.

Further, in accordance with the embodiment specified in claim 9, further advantages may be achieved, for example the advantage of detecting whether an item is placed e.g. correctly, for example lying flat on the conveyor or whether it is placed e.g. with a part turned under itself, e.g. more or less folded, which information also may be of importance in connection with the processing of the items. Also, the detection of bones, bone splinter, gristle, other matter, etc. may also detected using such equipment, which information may be used in connection with the processing of the items. Various embodiments of such equipment may be used, for example single ray and/or dual ray x-ray equipment, which will be apparent to the skilled person.

According to a further preferable embodiment, as specified in claim 10, said measured, detected and/or estimated data for the individual items may comprise data relating to the weight of the individual items, said data being provided by means of weight determining means, e.g. including means for direct weighing as well as means for calculating or estimating the weight based on various parameters.

Hereby it is achieved that the e.g. batching according to the first process may be performed in consideration of the weight or the estimated/calculated weight of the individual items in order to provide batches having an e.g. desired total weight, etc. as it is well-known within the field of batching, cf. the above- and below-mentioned prior art documents.

Advantageously, as specified in claim 11, said batching according to said first process and/or said step of identifying particular, e.g. in relation to said first process deviant items, may be controlled by control means.

Hereby, the processing may be controlled in an expedient manner using e.g. computerized control means also associated with the batching apparatus, the measuring and/or detection device, etc.

The invention further relates to a system for processing of items, said system comprising a batching apparatus and means for supplying said items to the batching apparatus, said batching apparatus comprising at least one handling means of the robot type, said batching apparatus being configured for performing a first process, according to which items are selectively batched in consideration of measured, detected and/or estimated data for the individual items and in consideration of at least one predefined criterion, said system further being configured for identifying particular items, which particular items by the system are led to another process, said particular items being items that are deviant in relation to one or more predefined parameter(s) relating to the batching and/or items that have not been selected to be batched during said first process.

By means of such a system, an enhanced efficiency is achieved, in particular the efficiency of the batching apparatus, e.g. the work rate, working speed etc., is enhanced and furthermore the supplied items can be used optimally, for example in dependence on the individual character and properties of the items.

Furthermore, it is made possible to use items as input material for such a system, for which items it is not necessary in advance to make certain that the items, as regards specified parameters, e.g. weight, length, volume, shape, fat content, etc., are within certain predefined limits. Thus, a hitherto unforeseen flexible use of the items is achieved, when compared with prior art systems, and furthermore, a hitherto unforeseen efficiency is achieved, since handling and processing of the possibly deviant items or items, which are not used for the batching while passing the operative batching area, takes place concurrent with the primary process, i.e. the robot based batching of items performed by the batching apparatus.

As mentioned above, particular items, which are led or diverted to the another, second or secondary process, for example items, which can not be used or which only with difficulty can be used for the building-up of a specific batch, for example because the items are too large or too small, e.g. as regards weight or volume. Moreover, it can be items that are more suitable for other purposes or applications, for example for cutting up, e.g. in strips or the like. As also mentioned above, it can be items, which is not positioned properly or in a required manner on the conveyor.

Items may also be led or diverted to the another, second or secondary process for reasons related to the quality of the items. For example, it may be particular items, which has an undesirable shape and/or which for example are not suitable for packaging together with other items and/or which may give an undesirable impression to the e.g. customer. Furthermore, items may be concerned, which have blood stains or for other reasons are deviant as regards the visual impression, e.g. due to discolouring, marbling, etc. Furthermore, it may be items that contain bones, bone splinters, gristle or similar/corresponding matter, which may make the items unsuitable for the batching process and more suitable for the another, second or secondary process. Even further, the meat quality in itself may also be of importance here, for example if the meat has to high a fat content or if the meat is too lean or if the colour of the meat, as also mentioned above, is not in correspondence with desired values, e.g. too light, too dark, undesirable marbling etc.

Further, certain items may be led to said another, second or secondary process, if the items for example should be handled with care, for example via a manual handling. Thus, it maybe items that are of a predefined high standard of quality and which therefore should be placed and positioned manually on a packaging medium in consideration of the high quality and in a manner, whereby the item, e.g. the piece of meat in the packaged form presents itself in such a manner that the high quality will be evident to the customer.

It is noted in this context that the terms "first process" and "another, second or secondary process" as used in connection with the present invention do not imply any particular relationship between these processes and the means used for performing these processes, neither as regards the time sequence nor the transport sequence through the system. Thus, nothing prohibits that the another, second or secondary process may take place prior to the first process in an item transport route and vice versa.

Advantageously, as specified in claim 13, said another process may comprise means for allocating a particular item to a purpose, which is different from the purpose related to said first process.

Hereby, an enhanced flexibility is achieved as regards the use of the supplied items and furthermore an optimal yield and use of the supplied items is achieved, e.g. since the supplied items may be allocated to the specific purposes or applications to which the individual items are better suited.

Thus, it will be understood that the invention as characterized in claim 12 may comprise that the particular items may be used for the same purpose as the first process, i.e. a batching, but in many circumstances it may be preferable to use the particular items for another purpose, which is different from the first purpose, as specified in claim 13.

According to a preferable embodiment, as specified in claim 14, said another process may comprise means for facilitating a cutting and/or trimming of the particular item.

Hereby, the particular items which may not be suitable for the batching according to the first process, may be processed in order to fulfil certain desired requirements.

According to a further preferable embodiment, as specified in claim 15, said another process may comprise means for facilitating a processing of the particular item, comprising e.g. a cutting and/or trimming of the particular item, whereby one or more processed items is/are provided, said one or more processed items being suitable for said first process, and wherein said system comprises a return transport route for recirculating said one or more processed items to said batching apparatus of the first process.

Hereby, the further advantage may be achieved that the yield of the batching according to the first process can be enhanced, if desired, thereby e.g. optimizing the work rate of the batching apparatus.

According to a still further preferable embodiment, as specified in claim 16, said system may comprise means for facilitating a manual processing of the particular item or items that are led to said another process.

Hereby, the individual particular items may be handled in a manner, whereby special consideration may be taken to the items, for example if the diverted item is an item of a particular high quality, which may prosper from for example a packaging which serves to present the high quality item in a manner, whereby the customer will immediately realize the high quality of the item, thereby enhancing the yield of the processing and the flexible use of the supplied items.

Preferably, as specified in claim 17, said batching apparatus for performing said first process may comprise at least two handling means of the robot type.

Hereby, a number of advantages is achieved, among these being that the number of otherwise suitable items, which are diverted because the robots can not manage to pick or grip the items while they are passing the operative work area for the robots, is reduced, thus adding to the efficiency of the method, e.g. because these items need not be recirculated, and adding to the optimal use of the items.

According to an advantageous embodiment, as specified in claim 18, said system may comprise one or more diverter wings or diverter arms, one or more robots or one or more corresponding handling means, which is/are adapted for handling of the particular items, e.g. the identified and in relation to said first process deviant items and/or the items that have not been used for the batching, in connection with said another process, e.g. for guiding or transferring said item(s).

Hereby, the items which are identified or in general detected as being particular items which must be led to the another, second or secondary process, can be diverted in an efficient manner using diverting means, which are well-known, or using new embodiments of such diverter means as exemplified in the detailed description, e.g. by using overhead diverter means with diverter flaps moving essentially across the conveyor means, by using diverter arms, which are movable also in the e.g. vertical direction, etc., whereby an enhanced operating efficiency is achieved, e.g. meaning that the items may diverted quickly and that the items may be conveyed with relatively little mutual space while still allowing the items to be selectively diverted.

Preferably, as specified in claim 19, said system may comprise a measuring or detecting device for providing said measured, detected and/or estimated data for the individual items.

Hereby, the relevant data for the supplied items may be provided in an expedient manner, for example prior to the supplied items reaching the batching apparatus. It is apparent that such a measuring or detecting device may provide information regarding one or more than one parameter, e.g. weight, estimated weight, volume, length, width, thickness, colour, orientation, fat content, marbling, bone content etc., and that these data may be provided using measuring, detecting, calculating etc., means already used in this technical field. Such means may comprise e.g. a static or a dynamic weigher, optical measuring means, magnetic or electromagnetic measuring means, x-ray measuring means, etc.

According to a further advantageous embodiment, as specified in claim 20, said system may comprise x-ray equipment, vision equipment and/or scanning equipment for providing said measured, detected and/or estimated data for the individual items.

Hereby, further advantages may be achieved, for example by using x-ray equipment, vision and/or scanning equipment for determining e.g. volume of the individual items, whereafter for example the weight of the items may be determined instead of weighing the items using an e.g. dynamic weighing machine.

Furthermore, when using e.g. vision equipment, camera means, etc. the position of the items, e.g. the items supplied on a conveyor may be determined or detected in an advantageous manner, whereby also the position of items being positioned close to each other, in positions next to each other in the transverse direction of the conveyor, etc. and even overlapping each other may be determined with a desired accuracy, whereby also this information may be provided to the other elements of the system, e.g. the robots, the diverter means, etc., allowing these to handle the items with e.g. required accuracy, even at fast work rates and high delivery rates. Further, certain quality parameters may also be detected and/or evaluated using vision equipment, such as for example colour characteristics, marbling, muscle structures, fat content, etc. Evidently, the dimensional parameter(s) such as length, width, etc. of the items may also be determined using vision equipment.

Further, in accordance with the embodiment specified in claim 9, further advantages may be achieved, for example the advantage of detecting whether an item is placed e.g. correctly, for example lying flat on the conveyor or whether it is placed e.g. with a part turned under itself, e.g. more or less folded, which information also may be of importance in connection with the processing of the items. Also, the detection of bones, bone splinter, gristle, other matter, etc. may also detected using such equipment, which information may be used in connection with the processing of the items. Various embodiments of such equipment may be used, for example single ray and/or dual ray x-ray equipment, which will be apparent to the skilled person.

According to a further preferable embodiment, as specified in claim 21, said measured, detected and/or estimated data for the individual items may comprise data relating to the weight of the individual items and that said measuring or detecting device may comprises weight determining means.

Hereby it is achieved that the e.g. batching according to the first process may be performed in consideration of the weight or the estimated/calculated weight of the individual items in order to provide batches having an e.g. desired total weight, etc. as it is well-known within the field of batching, cf. the above-mentioned prior art documents.

Advantageously, as specified in claim 22, said system may comprise control means for controlling said batching performed by said batching apparatus according to said first process and/or for controlling the identification of the particular items, e.g. the—in relation to said first process—deviant items.

Hereby, the processing may be controlled in an expedient manner using e.g. computerized control means also associated with the batching apparatus, the measuring and/or detection device, etc.

THE FIGURES

Figure 2:
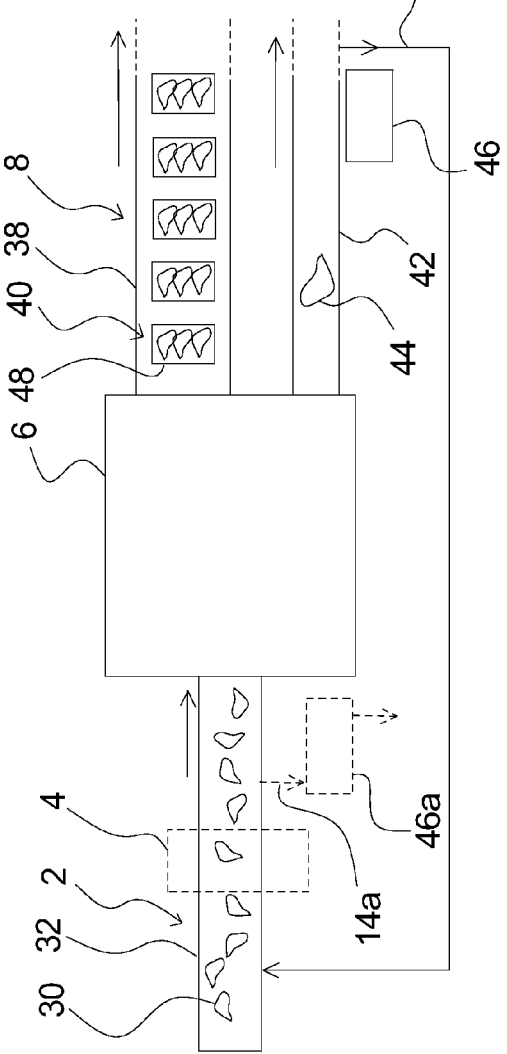
Figure 3:
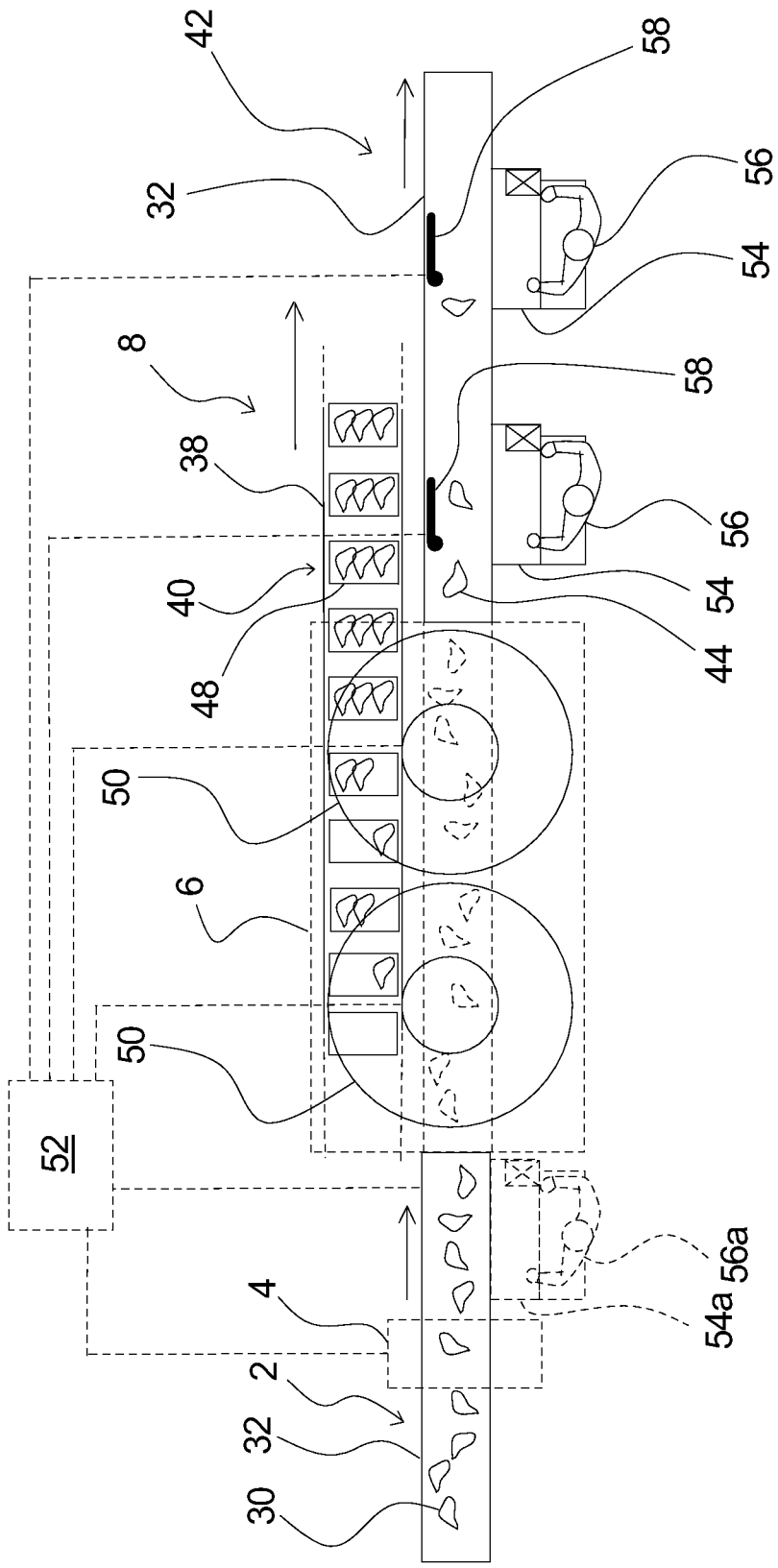
Figure 4A:
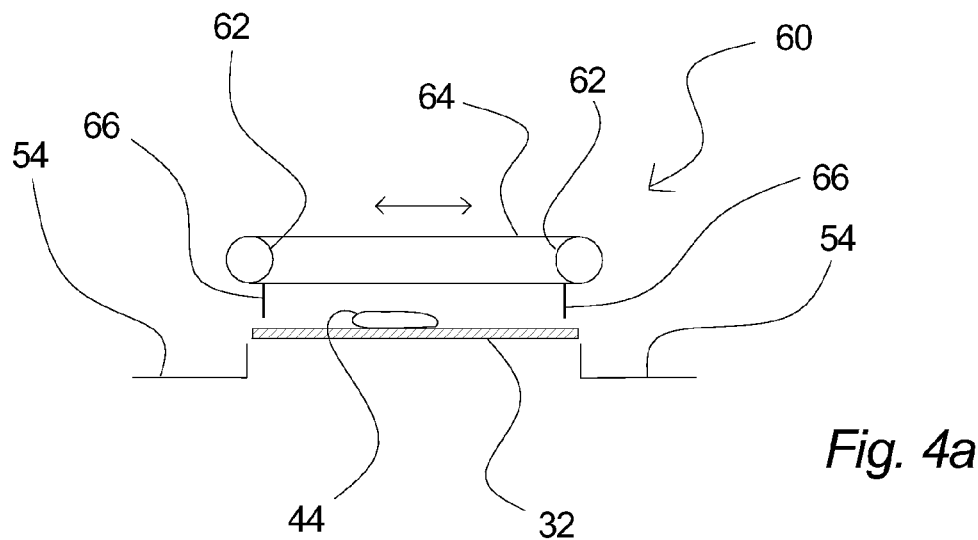
Figure 4B:
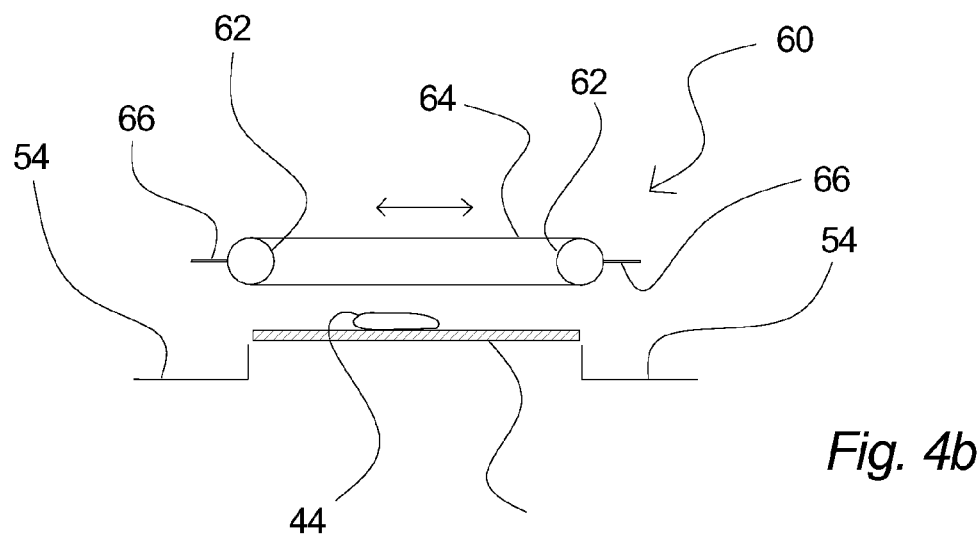
Figure 4C:
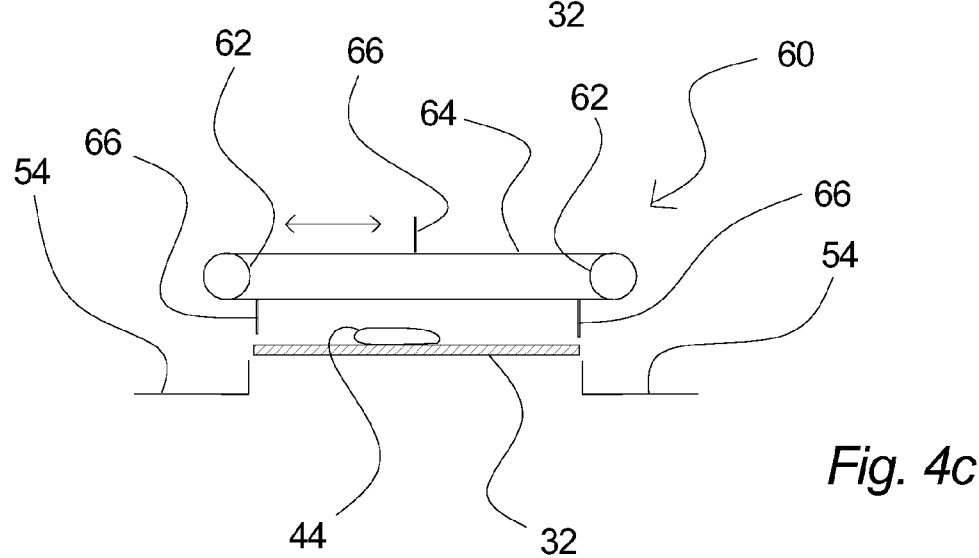
Figure 5:
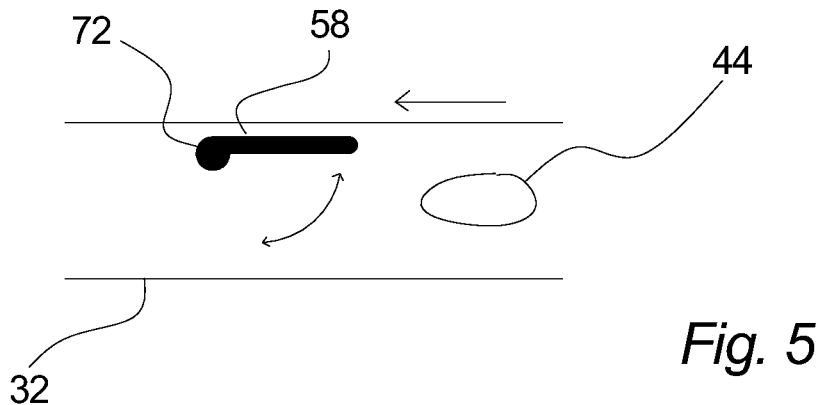
Figure 6:
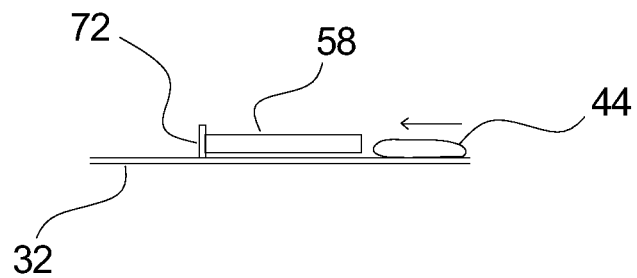
Figure 7:
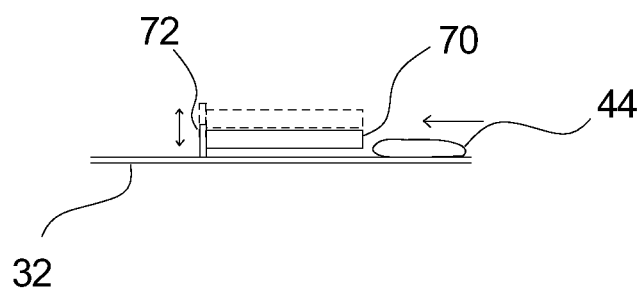
Figure 8:
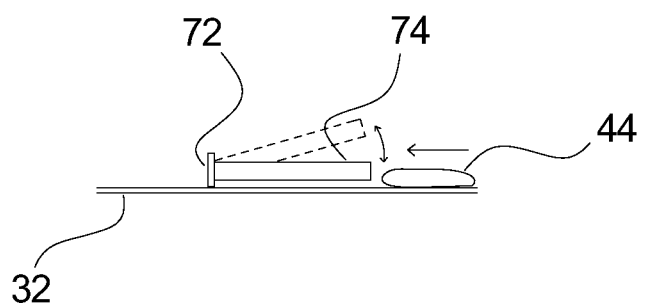

The invention will be explained in further detail below with reference to the figures of which FIG. 1 is a flow diagram for illustrating an embodiment of the invention, FIG. 2 shows an example of a batching apparatus, which forms part of a system according to a further embodiment of the invention, FIG. 3 shows a further example of an embodiment of a system according to the invention, FIGS. 4a-c show embodiments of diverter means placed above a conveyor and seen from the side of the diverter and in a sectional view through the conveyor, FIG. 5 shows an embodiment of a prior art diverter arm seen from above, FIG. 6 shows the diverter arm shown in FIG. 5 seen from the side of the conveyor, FIG. 7 shows in a side view an embodiment of a diverter arm according to a further aspect of the invention, and FIG. 8 shows in a side view a further embodiment of a diverter arm according to a further aspect of the invention.

DETAILED DESCRIPTION

In FIG. 1 is shown in a schematic view a flow diagram, showing the processing of items in accordance with an embodiment of the invention. The items that are processed using a method and/or a system according to the invention may be in particular foodstuff items such as meat items, vegetables, fruit etc., where the meat items may be parts of pigs, calves, sheep, lamb, fish, poultry such as chicken, etc., just as complete items of e.g. fish, poultry etc. may be processed. In FIG. 1 it is shown that a flow 2 of items is led to an automated batching apparatus 6, possibly after the items have passed a preceding device 4 for performing measurements, detections and/or analogous operations on the items. Such a measuring or detection device 4 may for example be a device, by means of which weight, volume, colour, shape, possible content of bone or bone splinter(s) etc., fat content or other characteristics for the items is/are measured and/or detected, for example using x-ray equipment, vision equipment, scanning equipment or corresponding equipment. Furthermore, the position, the orientation, etc. in relation to e.g. transport equipment such as for example a conveyor belt or similar means may be detected using e.g. such a measuring or detection device 4.

Furthermore, as it will be obvious to a person skilled within the art of batching, the positions of the supplied items are registered and by means of a monitoring and/or control system and on the basis of e.g. data concerning the conveying speed, the actual positions of the conveyed items will be known, thereby allowing the items to be selectively transferred to e.g. a selected position for the building-up of a batch as explained in further detail in the following.

The automated batching apparatus 6 is designed to bring a number of items together in a batch in such a manner that one or more predefined criteria is/are fulfilled for the batch of items. For example, a predefined number of items may be brought together in a batch, in addition or instead the batch may have a predefined total weigh, i.e. the combined weight of the items, or the total weight of the batch may be within a predefined limits. Furthermore, the items can be brought together in consideration of type, form and/or other characteristics of the items. Even further, two or more different types of batches may be produced by such a batching apparatus 6, for example batches having different total weights, which will be well-known to a person skilled within the art of batching.

A batching apparatus 6 may be equipped with various technical means for bringing the items together in batches such as for example robots as disclosed in e.g. WO 01/22043 A, WO 2006/061024 A1 and in PCT/DK2007/000237 (WO 2007/134603 A1 published 29 Nov. 2007), or diverter wings or diverter arms as disclosed for example in GB 2 116 732 A, EP 781 172 B and WO 00/23771 A. Other or corresponding means may be used as well for bringing the items together in batches, e.g. for gripping or picking up the items, for bringing the items to a selected spot, for diverting the items, for relocating the items etc. In connection with the invention a batching apparatus of the robot type will as mentioned above be used in connection with the first process, i.e. an apparatus wherein at least one handling device with at least three degrees of freedom is used for manipulating the items. With such a handling device an item can be gripped, picked up, lifted or similarly manipulated and moved to another position, where the item is placed.

Hence, the items that are brought together leave the batching apparatus 6 in batches and are as illustrated in FIG. 1 transported further on via a transport route 8 to one (or possibly two or more) further processing devices 10 such as for example a packaging device or an analogous device, where furthermore marking, labelling etc. may take place before the batches are transported further on 12, for example for storing, for distribution, etc. It is noted in this context that the items when being processed in the batching apparatus may be brought together on or in temporary means such as trays, bins or similar means, which trays, bins etc. may be recirculated after the completed batches have been transferred to a permanent packaging medium such as for example a packaging tray or a corresponding medium. However, the items may instead be brought together in batches direct on a permanent packaging medium in or at the batching apparatus 6, where after subsequent packaging steps such as covering, wrapping, labelling, etc. take place at the further processing device 10.

In connection with batching of items in or at the batching apparatus 6 it is intended that all the items that are delivered to the batching apparatus 6 are used, i.e. selectively transferred to a batch, which is well-known to a person skilled in the art. However, means may be provided in order to recirculate items, which potentially may find use for the batching process, but which have not been selected when they reach the effective operative limit for use during the transport through the batching apparatus, e. g. at the position where the item can not be gripped or picked by a handling means and transferred to a selected batch.

However, it is also a possibility that in the flow 2 of items that are led to the batching apparatus items are present, which as mentioned above for various reasons can not be used in the batching process or are not selected for the batching, for example because an item has an undesirable length, meaning that it can not be placed on a packaging medium without overhanging at least one of the ends or sides, in which case it can be problematic to perform a complete and/or prescribed packaging of the batch of items, at least when the packaging is performed in a partly or completely automated manner. Another example of such an item is an item which for some reason is too big and/or has an excessive weight, whereby it in consideration of size etc. of the items normally found in the flow of items makes it impossible to use the item for a batch together with other normally found items. Other examples of such items, which can not be used, can be found, depending on the type of items, that are being batched, and depending on the specific criteria used for the batching. Furthermore, it may be an item, which in principle can be used for the batching, but where the robot-based batching apparatus for one or more various reasons can not pick and place the item in a batch, e.g. the robot may not have the necessary time, before the item has passed the work zone for the batching apparatus 6. Furthermore, it may be items, which are better suited for other purposes, uses or applications, including for example another purpose as regards quality of the item, for example a purpose, which relates to items having a relatively high quality or a purpose that relates to items having a relatively lower standard of quality than e.g. items normally used for the batching according to the first process as also mentioned above.

In accordance with the invention such items may be identified for example by means of a central control unit, which receives input signals from e.g. the measuring or detection device 4 or the batching apparatus 6 and these identified items can be led to another processing or handling, type of operation, etc. This may for example take place as illustrated in FIG. 1, where these items by means of the batching apparatus 6 are led via a separate route 14 to a second or further processing device 16. It is apparent that items that leave the batching apparatus 6 at its exit, i.e. without having been selected for a batch, automatically will be identified as items that must be led to the second or further processing.

As shown with dotted lines in FIG. 1 such identified items may be led to the to second or further processing device 16 via a separate route 14a, which leads the items from the preceding measuring or detection device 4 to the second or further processing device 16, or which leads the items from a position between the measuring or detection device 4 and the batching apparatus 6 to the further processing device 16. A further option is that the further processing device 16 may be placed between the measuring or detection device 4 and the batching apparatus 6 or in the vicinity hereof. These and other optional embodiments will be comprised within the boundaries of the invention as also characterized by the claims.

The further process, handling, operation etc. may comprise that the item is allocated to another use or purpose than initially intended, for example in cases where pieces of meat are batched and where the deviant or diverted item for example may be used for another type of cutting than the type of cuttings which are being batched or where the deviant or diverted item in consideration of quality parameters is better suited for other purposes, for example if the item has a higher/lower standard of e.g. colour, fat content/leanness, marbling and/or other parameters for the items. In such cases the further or second processing may comprise or consist in a corresponding packaging and/or marking/labelling, which takes place at the second or further processing device 16, subsequent to which the item is transported further on 18 for storage, distribution, etc. However, the further processing may also involve a cutting, for example a cutting into strips, etc.

The further or second process or processing may also comprise or consist in that items are prepared, which can be used for the batching in the batching apparatus 6. For example, if the deviant items are to large, the further processing can comprise a cutting and/or trimming, which results in one or more items that may be returned via a return transport route 20, whereby these resulting items may be entered as an input flow 22 to the batching apparatus 6, possibly via the measuring or detecting device 4.

In FIG. 2 is shown in more detail an example of a batching apparatus 6, which is adapted to perform in accordance with an embodiment of the invention and which comprises at least one handling device of the robot type for selectively placing the items in batches 40. As shown, a feeding conveyor 32, e.g. a conveyor belt, is provided for supplying the items 30 to the batching apparatus 6, possibly via a measuring or detecting device 4. As explained above, the batching apparatus 6 performs a batching of the supplied items 30, controlled by a control unit and on the basis of data for the individual items and in consideration of one or more predefined criterion/criteria. Thus, batches 40 are formed that as indicated in FIG. 2 may be batched or placed on a packaging tray 48 or similar means, which are transported further on by means of a conveyor 38, e.g. a conveyor belt, for example to a place of packaging, labelling, storing, distribution, etc (not shown in FIG. 2).

If an item 44 is detected, which item 44 for some reason can not be used for the batching, for example because it has a deviant size and/or weight, e.g. to large, a deviant quality, leanness, colour, marbling etc. as also mentioned above, and/or because the item has not been selected for use in the batching process even though it is suitable, the item 44 can be led to a conveyor 42, e.g. a conveyor belt, by means of which it is transported via a separate route, where as previously described the item 44 may be used for another application, for example used for another type of cutting, for cutting up in smaller parts, for cutting into strips, mincing or chopping, etc. As illustrated in FIG. 2, this may take place by having a manual and/or automated inspection and/or processing taking place at a work station 46, after which the item is allocated to a suitable use or application, for example selected among a number of possible uses. Furthermore, a processing may be performed at this work station 46, for example a trimming or cutting, which may result in trim parts being produced that may be allocated to mincing or a similar purpose. It will be understood that more than one transport route leading from the workstation 46 may be provided and that the workstation 46 may be provided with one or more trays, bins or similar means, where parts for various uses or applications may be placed for further processing. Even further, it will be understood that items 44, which are supplied via the conveyor 42, may be used in connection with another type of batching, which thus may represent—completely or in part—the abovementioned second process, where the batching may take place in various manners, e.g. using diverter wings, manual handling, robots, etc.

As further shown in FIG. 2 with punctuated lines and in correspondence with what has been explained above in connection with FIG. 1, items 44, which for some reason can not be used or which are not desired to be used for the batching, may be led to a workstation 46a corresponding to the workstation 46, via the transport route 14a. This transport route 14a leads the items from the preceding measuring or detection device 4 to the workstation 46a or from a position between the measuring or detection device 4 and the batching apparatus 6 to the workstation 46a. It is apparent that the workstation 46a may be placed between the measuring or detection device 4 and the batching apparatus 6 or in the vicinity hereof. Moreover, it is apparent that the items, which have been identified to be led to the further or second processing may be led to the workstation 46a by means of diverter wings or corresponding means, which are well-known to the skilled person. Even further, it is apparent that if a workstation for the further processing is placed as the workstation 46a, the workstation 46 may be dispensed with, but it will also be understood that both workstations may be used concurrently. Similarly, more than one workstation of each of the abovementioned types may be provided. These embodiments and similar options will be within the scope of the invention as characterized in the claims.

A further example of an embodiment of the invention is shown in FIG. 3 where the items 30 are via a feeding conveyor 32, e.g. a conveyor belt, are delivered to the batching apparatus 6, preferably via a measuring or detection device 4. The batching apparatus 6, the outline of which is shown with punctuated lines, is in FIG. 3 shown equipped with two schematically indicated handling means of the robot type or robots 50, as they will also be referred to for the purpose of this application. These robots 50 are configured for selectively moving items from the conveyor 32 to selected packaging or batching means, trays or the like 48, controlled by e.g. computerized central control means 52. The packaging or batching means, trays or the like 48 with the completed batches 40 are conveyed by means of a conveyor 38, e.g. a conveyor belt, which is moving for example in parallel with the conveyor 32, e.g. in the same direction as shown in FIG. 3 or in the opposite direction. It will be understood that the conveyor 38 may also support the packaging or batching means, trays or the like 48 when the batches are formed, meaning that the packaging or batching means, trays or the like 48 are moving while the batches are formed. It will thus also be understood that a batch must be completed before a limit position is reached, from which the (completed) batch is conveyed away for packaging, labelling, etc. as previously described.

The possible deviant items 44 or items 44 that can not be placed in a batch for other reasons as explained above, leaves the batching apparatus 6 via a transport route 42 as indicated by the arrow. This transport route may be a separate conveyor (not shown) in continuation of the conveyor 32, but it may as shown be a direct extension of the conveyor 32, e.g. the conveyor belt, which in this case is designed with a corresponding sufficient length. These items 44 are thus conveyed to the second process, which as explained above may be another type of batching and/or a further processing, cutting, trimming, manual handling, etc.

The handling or processing of the deviant items 44 or items 44 that for some other reasons are diverted from the first process, i.e. the batching process may take place by allocating the items to the potential workstations, e.g. workstations 54, controlled by e.g. a central control 52. The actual distribution of the items 44 may be performed by means of diverter wings 58 or corresponding handling means and the items 44 may for example be batched at the respective workstations and/or processed, handled or correspondingly treated by operators 56 placed at the workstations 54. In FIG. 3 two such workstations are shown, but it will be understood that only one or more than two workstations, e.g. three, four, five, etc., may also be used in accordance with this embodiment of the invention. It is also apparent that further means such as conveyor means, conveyor belts, etc., for conveying the yield, e.g. processed items, batches, trim parts etc., from the workstations 54 and further on for e.g. packaging, labelling, storing etc. These further means have not been shown in FIG. 3.

In correspondence with what has been explained above in connection with the embodiments shown in FIGS. 1 and 2 and as shown with punctuated lines in FIG. 3, items 44, which for some reason can not be used or are not desired to be used for the batching and which for example have been identified by the preceding measuring or detection device 4, can be led to a workstation 54a that is placed after the measuring or detection device 4 but prior to the batching apparatus 6, at which workstation 54a the item/items can be handled by an operator 56a. The item 44 may for example be led or guided to this workstation 54a by means of a diverter wing (not shown) or corresponding means as also mentioned above. Possibly the item 44 can be led to the workstation 54a direct from the measuring or detection device 4. It is apparent that a plurality of such workstations 54a may be located between the measuring or detection device 4 and the batching apparatus 6 or in the vicinity hereof. Similarly, it is apparent that if one or more workstations placed as the workstation 54a is/are used, the workstations 54 may be dispensed with, but it is also apparent that both locations for workstations may be used concurrently. Even further, it will be understood that where a plurality of workstations 54, 54a are present, for example two workstations 54 as shown in FIG. 3, not both (or all, if more than two workstations are present) of these need necessarily be manned with an operator 56, since the output of items 44 may, depending on the actual circumstances, be relatively small. Thus, one operator 56 may take care of more than one workstation 54 and/or 54a, e.g. by observing whether an item or items 44 has/have been led to the other or one of the other workstations not actually manned, in which case the operator 56 or 56a can go to the relevant workstation at a suitable time and take care of the processing, e.g. handling, cutting, trimming etc. of the item (or items) located here. Moreover, it is noted that the workstations to which the particular items 44 are led to, may be more or less automated. Thus, automated machines such as portion cutters, strippers, mincing machines, etc. may be utilized in connection with the another, second or secondary process that is being performed. Thus, it will also be understood that the workstations e.g. 56, 56a may manually operated and/or may be partly of fully automated, and that a combination hereof is possible, e.g. for example a configuration having one or more manually operated workstations and one or more automated machines for performing the another, second or secondary process of the particular items. These embodiments and similar optional embodiments will be within the scope of the invention as characterized in the claims.

In FIG. 3 control means in the form of central control means 52 have been illustrated with punctuated lines, and further is as been indicated with punctuated lines that control data and/or measured, detected and/or estimated data can be communicated to and/or from the control means 52, for example data from the measuring or detecting device 4, speed data concerning the feeding conveyor 32, control data to the handling means of the robot type 50, control data to the diverter wings 58, etc. It will be obvious to the skilled person that central and/or distributed control may be applied in such a system and further it will be obvious that other components, parts, devices etc. than the examples shown in FIG. 3 may communicate and/or be controlled by e.g. the central control means 52.

In connection with the embodiments described above, it has been explained that the items 44 that are identified as items that are to be processed by the second process, which is also referred to as the another or the further process, are diverted by diverter means such as diverter wings, diverter arms, etc. Such diverter means may be designed and configured in numerous ways and a number of further examples will be described in the following with reference to FIGS. 4a-4c and 5-8.

In FIG. 4a an embodiment of an overhead diverter 60 is shown, i.e. a diverter which is placed essentially above e.g. the conveyor 32, on which an item 44 is conveyed. Such an overhead diverter 60 may as illustrated comprise two rollers, wheels or the like 62, upon which a member in the form of a diverter belt, chain or the like 64 is mounted in such a manner that the diverter belt, chain or the like 64 may move essentially in a traverse direction in relation to the conveyor 32, either in one direction only or in both directions. For example, one of the rollers 62 may be an electric motor, e.g. a drum motor. Diverter means in the form of one or more, e.g. two as shown, diverter flaps 66 is/are placed on this diverter belt, chain or the like 64. Thus, it will be understood that when the diverter belt, chain or the like 64 is moved, the item 44 is diverted to one of the workstations 54 by means of one of the flaps, depending on the direction of rotation of the rollers 62. It will be seen that such an overhead diverter may be designed in such a manner that the diverter belt, chain or the like 64 need only move a distance necessary for one of the diverter flaps 66 to push or throw the item to the selected workstation 54, i.e. since the diverter belt, chain or the like 64 need not move back to an initial position, when e.g. the diverter flaps 66 are placed at predefined positions, e.g. depending on the width of the conveyor 32, etc.

Thus, an improved efficiency can be achieved in relation to for example a diverter wing 58 as shown in FIGS. 5 and 6, where the diverter arm 58 is configured for being pivoted about the vertical axis defined by the support 72, e.g. as shown in FIG. 5, where it is indicated that the diverter arm 58 may swing in to a position essentially transverse to the conveyor 32. It will thus be seen that such a diverter arm 58 will normally have to be positioned in the initial position shown in FIG. 5, e.g. in parallel with the conveyor 32, in order to allow items to pass freely. Only when an item 44 has to be removed, is the diverter arm moved inwards. Thus, if it is desired to remove the item to the right side (in relation to the drive direction of the conveyor 32), the diverter arm has to be moved inwards in order to catch the item 44 and subsequently move or throw the item 44 to the side of the conveyor 32 by moving the diverter arm to the initial position. Thus, the diverter arm has to pivot in and out, i.e. two separate movements.

In relation to this, the overhead diverter 60 shown in FIG. 4a has only to perform one movement in order to remove the item 44 from the conveyor.

In FIGS. 4b and 4c further embodiments of such an overhead diverter 60 are shown. These embodiments correspond essentially to the embodiment shown in FIG. 4a, but in FIG. 4b the diverter flaps 66 have been placed with an even mutual distance. Thus, when the diverter belt, chain or the like 64 from an initial position as shown in FIG. 4b has moved a distance corresponding to the distance between the diverter flaps 66, a position is reached where the diverter flaps are placed as shown in FIG. 4b (but moved one step), corresponding to the initial position.

A similar arrangement is shown in FIG. 4c, but here three diverter flaps 66 are shown evenly spaced, whereby a corresponding advantage is achieved, e.g. that the diverter belt, chain or the like 64, when it has been moved a distance in order to divert an item 44, it will be in a position, where the next diverter flap 66 is positioned, ready to divert an item 44, or the diverter flap 66, that has just diverted an item 44, will be ready to divert an item, in case the diverter belt, chain or the like 64 is moved in the opposite direction, which also is an option that is provided by the overhead diverter arrangement 60.

It will be understood that the embodiments shown in FIGS. 4a-4c are shown in a schematic manner and that various modifications are possible. For example, more than three diverter flaps 66 may be used and these flaps may be provided in numerous forms. Further, it will be understood that the diverter flaps 66 preferably may be adapted to move as close to the e.g. conveyor 32 in order to divert the items 44 in an appropriate manner.

The advantage achieved by the above-described overhead diverter means 60, e.g. an increased efficiency and faster action may also be achieved by embodiments of the diverter arm as shown in FIGS. 7 and 8.

In FIG. 7 a diverter arm 70 is shown, which is supported by the support 72 and which may be moved vertically as shown by the double-headed arrow as well as pivoted about the vertical axis defined by the support 72. Thus, this diverter arm 70 may be positioned in a transverse position in relation to the conveyor 32 without interfering with items being conveyed, when the diverter arm 70 is lifted as shown with punctuated lines in FIG. 7, whereby an increased efficiency can be achieved, e.g. since the diverter arm need not perform two separate movements in the horizontal plane, but need only lower the diverter arm 70 a relatively small distance and—subsequently or simultaneously—move the diverter arm 70 to divert the item 44.

A modified or alternative embodiment of such a diverter arm is shown in FIG. 8, where the diverter arm 74 is adapted to pivot not only about an vertical axis defined by the support 72 but also about an horizontal axis also defined by or located near the support 72. Thus, as shown in FIG. 8 with punctuated lines, the diverter arm 74 may be lifted sufficiently to allow items to pass underneath it, when it is positioned in a transverse position in relation to the conveyor 32. Hereby, an advantage similar to the advantage described above for the diverter arm 70 may be achieved, e.g. an increased efficiency.

It will be apparent that the embodiments described in connection with FIGS. 7 and 8 may be combined, e.g. allowing the diverter arm to be lifted vertically by the support 72 as well as pivoted in a vertical plane and in relation to the support 72.

Furthermore, the skilled person will be aware that the embodiments shown in FIGS. 5-8 are shown with the diverter arms 58, 70, 74 pointing in the direction, from which the item 44 is arriving, when the diverter arm is in the initial position, e.g. along the side of the conveyor. The skilled person will also be aware that the diverter arm may be located pointing in the direction, wherein the item 44 is being transported, when the diverter arm is in the initial position, e.g. along the side of the conveyor. This is shown in FIG. 3, where the diverter arms 58 are shown in such an embodiment. It will be apparent to a skilled person that the modifications described above in connection with FIGS. 7 and 8 may also be applied to a type of diverter arm 58 as shown in FIG. 3.

Other combinations and/or embodiments of the diverter means are possible, which will be obvious to the skilled person.

It is moreover apparent that the method and the system according to the invention may be designed and adapted in various different manners within the scope of the patent claims. Hence, various forms of conveying means, conveyor belts, measuring, detection and/or vision means may be used and the batching may be performed in a multitude of different ways, for example as described in the previously mentioned patent documents, which will be apparent to the skilled person.

LIST OF REFERENCES

2 Flow of items
4 Measuring or detecting device
6 Batching apparatus
8, 12, 18 Transport route for e.g. storing, distribution etc.
10, 16 Further processing device
14, 14*a* Separate transport route
20 Return transport route
22 Input flow
30 Item
32 Feeding conveyor
38, 42 Conveyor
40 Batch
44 Item
46, 46*a*, 54, 54*a* Work station
48 Batching tray, packaging tray or the like
50 Handling means of the robot type
52 Control means
56, 56*a* Operator
58 Diverter wing or diverter arm
60 Overhead diverter
62 Roller or the like
64 diverter belt, chain, etc.
66 Diverter flap
70, 74 Diverter wing or diverter arm
72 Support for diverter wing or diverter arm

What is claimed is:

1. A method of processing a plurality of food items that are supplied to a batching system, said batching system comprising at least one batching apparatus including at least one robot for handling at least a subset of said plurality of food items, said batching system for performing the method comprising the steps of:

determining data relating to a weight of each one of the food items of the subset of food items;

transporting said subset of food items to a location for performing a batching process using the batching apparatus;

performing said batching process on the transported subset of food items at said location, said batching process including the step of selecting and batching, using said robot, one or more of the food items of said subset in consideration of measured, detected, and/or estimated data including said data relating to the weight determined for each one of the food items, wherein said batching process is performed in such a manner that each batch of food items fulfils a predetermined criteria associated with that particular batch, wherein said fulfilling of said predetermined criteria is established with respect to said measured, detected, and/or estimated data of the food items in the respective batches, and wherein said predetermined criteria includes a total weight of the food items provided in the respective batches; and wherein said method further comprises the steps of:

identifying, from the plurality of food items, particular food items that deviate from one or more predefined parameter(s) and/or particular food items that have not been selected to be batched during said batching process; and performing a different process on at least a subset of the particular food items such that the subset of the particular food items are processed differently than the batched food items to obtain processed food items.

2. The method of claim 1, wherein said measured, detected, and/or estimated data utilizes the number of food items, the form of food items, and/or the type of food items.

3. The method of claim 1, wherein said predetermined criteria are different for at least some of the batches.

4. The method according to claim 1, wherein the different process comprises the step of allocating said particular food items based on a purpose of the item, which is different from a purpose related to said batching process.

5. The method according to claim 1, wherein said different process comprises the step of cutting and/or trimming of the particular food items.

6. The method according to claim 1, wherein said different process comprises the steps of:
cutting and/or trimming the particular food items to produce one or more processed food items that are suitable for said batching process; and
recirculating, via a return transport route, said processed food items to said batching process for batching said processed food items.

7. The method according to claim 1, wherein said different process includes manual processing of the particular food items.

8. The method according to claim 1, wherein said batching process is performed using at least two of said robots.

9. The method according to claim 1, wherein said different process includes the step of handling one or more of said particular food items for guiding or transferring said one or more of said particular food items by utilizing one or more diverter wings or diverter arms.

10. The method according to claim 1, wherein some part of said measured, detected and/or estimated data are provided by means of at least one measuring or detecting device.

11. The method according to claim 1, wherein some part of said measured, detected and/or estimated data are provided by means of x-ray equipment, vision equipment, and/or scanning equipment.

12. The method according to claim 1, wherein said batching process and/or said different process are controlled by a controller comprised in said system.

13. A system for processing a plurality of food items into batches, said system comprising:
a conveyor for transporting at least a subset of the plurality of food items to a batching apparatus;
a batching apparatus including a robot for batching the transported subset of the food items into batches by using said robot to select one or more of the food items of said subset of food items in consideration of measured, detected, and/or estimated data about each one of said food items, wherein said measured, detected, and/or estimated data include data relating to a weight determined for the respective food items, wherein
said selecting is performed in a manner such that each batch of food items fulfils a predetermined criteria associated with that particular batch, such that said fulfilling of said predetermined criteria is established with respect to said measured, detected, and/or estimated data of the food items in the respective batches, and wherein said predetermined criteria includes a total weight of the food items provided in the respective batches;
a processor adapted for identifying, from the plurality of food items, particular food items that deviate from one or more predefined parameter(s) and/or particular food items that have not been selected to be batched during said batching process;
a different apparatus; and
a conveyor for leading said particular food items to said different apparatus, wherein leading said particular food items to said different apparatus comprises use of one or more diverter means, and wherein said particular food items are processed differently than the batched food items to obtain processed food items.

14. The system of claim 13, wherein said processor is also adapted for said consideration of measured, detected, and/or estimated data about each one of said plurality of food items.

15. The system of claim 13, wherein said predetermined criteria are different for at least some of the batches.

16. The system according to claim 13, wherein said different apparatus comprises allocation means for allocating said particular food items based a purpose of the particular food items which is different from the purpose of the food items batched by said batching apparatus.

17. The system according to claim 13, wherein said different apparatus comprises cutting means for facilitating a cutting and/or trimming of the particular food items.

18. The system according to claim 13, wherein said different apparatus comprises:
cutting means for facilitating a processing of at least a subset of the particular food items for cutting and/or trimming of the subset of the particular food items for making the subset of the particular food items suitable for batching by said batching apparatus; and
a conveyor for recirculating said subset of the particular food items that were cut and/or trimmed to said batching apparatus for batching said subset of the particular food items.

19. The system according to claim 13, wherein said different apparatus comprises means for facilitating a manual processing of the particular food items that are led to said another process.

20. The system according to claim 13, wherein said batching apparatus further comprises at least one additional robot.

21. The system according to claim 13, wherein diverter means comprises one or more diverter wings or diverter arms, and wherein said system further comprises one or more additional robots comprised in said different apparatus which is/are adapted for handling of said particular food items in connection with said another process including guiding or transferring said particular food items.

22. The system according to 13, wherein said system further comprises a measuring or detecting device for providing at least a portion of said measured, detected and/or estimated data for the plurality of food items.

23. The system according to claim 13, further comprising one or more of: x-ray equipment, vision equipment and/or scanning equipment for providing at least a portion of said measured, detected and/or estimated data for the plurality of food items.

24. The system according to claim 13, wherein said processor is further adapted for controlling the batching performed by said batching apparatus.

25. A method of processing a plurality of food items that are supplied to a batching system, said batching system comprising at least one batching apparatus including at least one robot for handling at least a subset of said food items, said batching system for performing the method comprising the steps of:
determining data relating to a weight of each one of the food items of the subset of food items;
transporting said subset of food items to a location for performing a batching process using the batching apparatus;
performing said batching process on the transported subset of food items at said location, said batching process including the step of selecting and batching, using said robot, one or more of the food items of said subset of food items in consideration of measured, detected, and/ or estimated data including said data relating to the weight determined for each one of the food items, wherein said batching process is performed in such a manner that each batch of food items fulfils a predetermined criteria associated with that particular batch, wherein said fulfilling of said predetermined criteria is established with respect to said measured, detected, and/or estimated data of the food items in the respective batches; and wherein said method further comprises the steps of:

identifying, from the plurality of food items, particular food items that deviate from one or more predefined parameter(s) and/or particular food items that have not been selected to be batched during said batching process; and performing a different process on at least a subset of the particular food items such that the subset of the particular food items are processed differently than the batched food items to obtain processed food items.

26. The method of claim 25, wherein said measured, detected, and/or estimated data utilizes the number of food items, the form of food items, and/or the type of food items.

27. A method of processing a plurality of food items that are supplied to a batching system, said batching system comprising at least one batching apparatus including at least one robot for handling at least a subset of said plurality of food items, said batching system for performing the method comprising the steps of:

determining data relating to a weight of each one of the food items of the subset of food items;

transporting said subset of food items to a location for performing a batching process using the batching apparatus;

performing said batching process on the transported subset of food items at said location, said batching process including the step of selecting and batching, using said robot, one or more of the food items of said subset in consideration of measured, detected, and/or estimated data including said data relating to the weight determined for each one of the food items, wherein said batching process is performed in such a manner that each batch of food items fulfils a predetermined criteria associated with that particular batch, wherein said fulfilling of said predetermined criteria is established with respect to said measured, detected, and/or estimated data of the food items in the respective batches, and wherein said predetermined criteria includes a total weight of the food items provided in the respective batches; and wherein said method further comprises the steps of:

identifying, from the plurality of food items, particular food items that deviate from one or more predefined parameter(s) and/or particular food items that have not been selected to be batched during said batching process; and performing a different process on at least a subset of said particular food items such that the food items of the subset of the particular food items are processed differently than the batched food items to obtain processed food items, wherein leading said particular food items to said different process comprises use of one or more diverter means.

* * * * *